United States Patent
Kohlstrand

(10) Patent No.: US 7,695,047 B2
(45) Date of Patent: Apr. 13, 2010

(54) MULTI-MODE LOAD BED COVER FOR AUTOMOTIVE VEHICLE

(75) Inventor: Kelly Michael Kohlstrand, Wyandotte, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 12/184,295

(22) Filed: Aug. 1, 2008

(65) Prior Publication Data

US 2009/0195012 A1 Aug. 6, 2009

Related U.S. Application Data

(60) Provisional application No. 61/026,553, filed on Feb. 6, 2008.

(51) Int. Cl.
*B60P 7/04* (2006.01)
(52) U.S. Cl. ............... 296/100.01; 296/100.15; 296/100.16; 296/98
(58) Field of Classification Search ............ 296/100.15, 296/100.16, 100.18, 98, 100.1; 160/133, 160/239, 241
See application file for complete search history.

(56) References Cited

U.S. PATENT DOCUMENTS

| | | | | |
|---|---|---|---|---|
| 3,146,824 A | * | 9/1964 | Veilleux | 160/23.1 |
| 3,667,802 A | * | 6/1972 | Love | 296/98 |
| 3,819,082 A | * | 6/1974 | Rosenvold | 220/200 |
| 4,611,848 A | | 9/1986 | Romano | |
| 4,784,427 A | | 11/1988 | Burgess | |
| 4,786,099 A | | 11/1988 | Mount | |
| 4,795,206 A | | 1/1989 | Adams | |
| 4,889,381 A | | 12/1989 | Tamblyn et al. | |
| 5,040,843 A | | 8/1991 | Russell et al. | |
| 5,186,231 A | * | 2/1993 | Lewis | 160/310 |
| 5,330,246 A | | 7/1994 | Bernardo | |
| 5,350,213 A | | 9/1994 | Bernardo | |
| 6,003,923 A | | 12/1999 | Scott et al. | |
| 6,053,556 A | * | 4/2000 | Webb | 296/98 |
| 6,106,051 A | | 8/2000 | Miskowic | |
| 6,142,553 A | * | 11/2000 | Bodecker | 296/98 |
| 6,321,819 B1 | | 11/2001 | Copp et al. | |
| 6,725,807 B1 | * | 4/2004 | Tapia | 119/496 |
| 6,783,169 B1 | | 8/2004 | Marx et al. | |
| 6,846,032 B2 | | 1/2005 | de Gaillard et al. | |
| 6,976,724 B2 | * | 12/2005 | Wheatley | 296/100.16 |
| 2003/0230909 A1 | | 12/2003 | Melius et al. | |

* cited by examiner

*Primary Examiner*—Jason S Morrow
(74) *Attorney, Agent, or Firm*—Jerome R. Drouillard; Greg Brown

(57) ABSTRACT

A multi-mode load bed cover for an automotive vehicle includes first and second cover sectors which are deployable laterally from within a housing associated with a bodyside of a load bed.

12 Claims, 8 Drawing Sheets

MULTI-MODE LOAD BED COVER FOR AUTOMOTIVE VEHICLE

CROSS REFERENCE TO RELATED APPLICATIONS

This application claims the benefit of U.S. Provisional Application Ser. No. 61/026,553 filed on Feb. 6, 2008.

BACKGROUND OF THE INVENTION

1. Field of the Invention

The present invention relates to a sliding cover for a load bed or box of the type often found on a pickup truck.

2. Disclosure Information

Sliding covers for load beds have typically been used for years with vehicles such as pickup trucks. U.S. Pat. No. 4,784,427 discloses such a cover in which the sliding components are stored in an enclosure attached to the head rail of the pickup box. A problem exists with the system of the '427 patent, however, because testing has determined that in order to maximize fuel efficiency of a vehicle, particularly a pickup truck, it is desirable that the rearward portion of the pickup box be covered, as opposed to the front portion, if fuel economy is to be maximized, through reduced aerodynamic drag notwithstanding that the box is partially uncovered. Unfortunately, the system of the '427 patent is not capable of permitting the only rearward portion of the box to be covered, while allowing a taller object to be carried in an open front portion of the box.

It would be desirable to provide a load bed cover for an automotive vehicle, such as a pickup truck, in which a cover could be operated so as to provide maximum fuel efficiency and flexibility in terms of the portions of the load bed which the cover encloses.

SUMMARY OF THE INVENTION

According to an aspect of the present invention, a multi-mode load bed cover for an automotive vehicle includes a first cover sector which is deployable laterally from within a housing associated with a bodyside of a load bed. A second cover sector, also deployable laterally from within the housing, cooperates with the first cover sector to enclose the entirety of the load bed. This enclosure is selective because different portions of the first and second cover sectors may be employed to enclose either portions, or no part of, the load bed.

According to another aspect of the present invention, the first cover sector and the second cover sector are flexible and are stowable upon separate winders located within a housing associated with the bodyside of the load bed.

According to another aspect of the present invention, a multi-mode load bed cover further includes a forward guide, located proximate a front end of the load bed, and a trailing guide, located proximate the trailing end of the load bed, with the first cover sector engaging the forward guide when the first cover sector is deployed, and the second cover sector engaging the trailing guide when the second cover sector is deployed. A mid-bed guide, positioned between the first and second cover sectors, and extending laterally across the top of the load bed, provides support for the first and second cover sectors when they are in closed, or at least partially closed, modes. The mid-bed guide preferably comprises an independent rail attached to the left and right bodyside portions of the load bed, with the rail having recesses for slidingly receiving the first cover sector and second cover sector. Alternatively, the mid-bed guide may comprise a number of alpha rail segments attached to the first cover sector and a number of beta rail segments attached to the second cover sector, such that the alpha and beta rail segments mesh with one another to support the cover sectors when they are in the deployed position.

According to another aspect of the present invention, the first cover sector and second cover sector are positionable in at least a first mode in which the entirety of the load bed is enclosed, and a second mode in which only a forward portion of the load bed is enclosed by the first cover sector. According to a third mode, only the rearward portion of the load bed is enclosed by the second cover sector, and according to a fourth mode, none of the load bed is enclosed by either the first cover sector or the second cover sector. An additional mode is one in which the first cover sector is closed over the load bed and the second cover sector is only partially closed over the load bed. Finally, the first cover sector may be partially closed over the load bed, with the second cover sector being only partially closed over the load bed.

According to another aspect of the present invention, a multi-mode load bed cover is deployable in a maximum fuel saving mode in which the first cover sector over a forward portion of the bed and the second cover sector over a rearward portion of the bed are both closed over the load bed, with the covers being deployable in a partial fuel saving mode in which the first cover sector is open and the second cover sector is at least partially closed.

It is an advantage of a multi-mode load bed cover according to the present invention that the cover may be opened and closed in a variety of positions, so as to provide a place for a tall object at the front of the load bed, while preserving higher fuel efficiency by permitting a more rearward portion of the load bed to be covered.

It is yet another advantage of a load bed cover according to the present invention that improved aerodynamics and resultant fuel economy may be achieved with a vehicle having the capability of transporting various bulky objects which do not occupy the entire bed of a pickup truck.

Other advantages, as well as features of the present invention, will become apparent to the reader of this specification.

DETAILED DESCRIPTION OF THE PREFERRED EMBODIMENT

Figure 1:
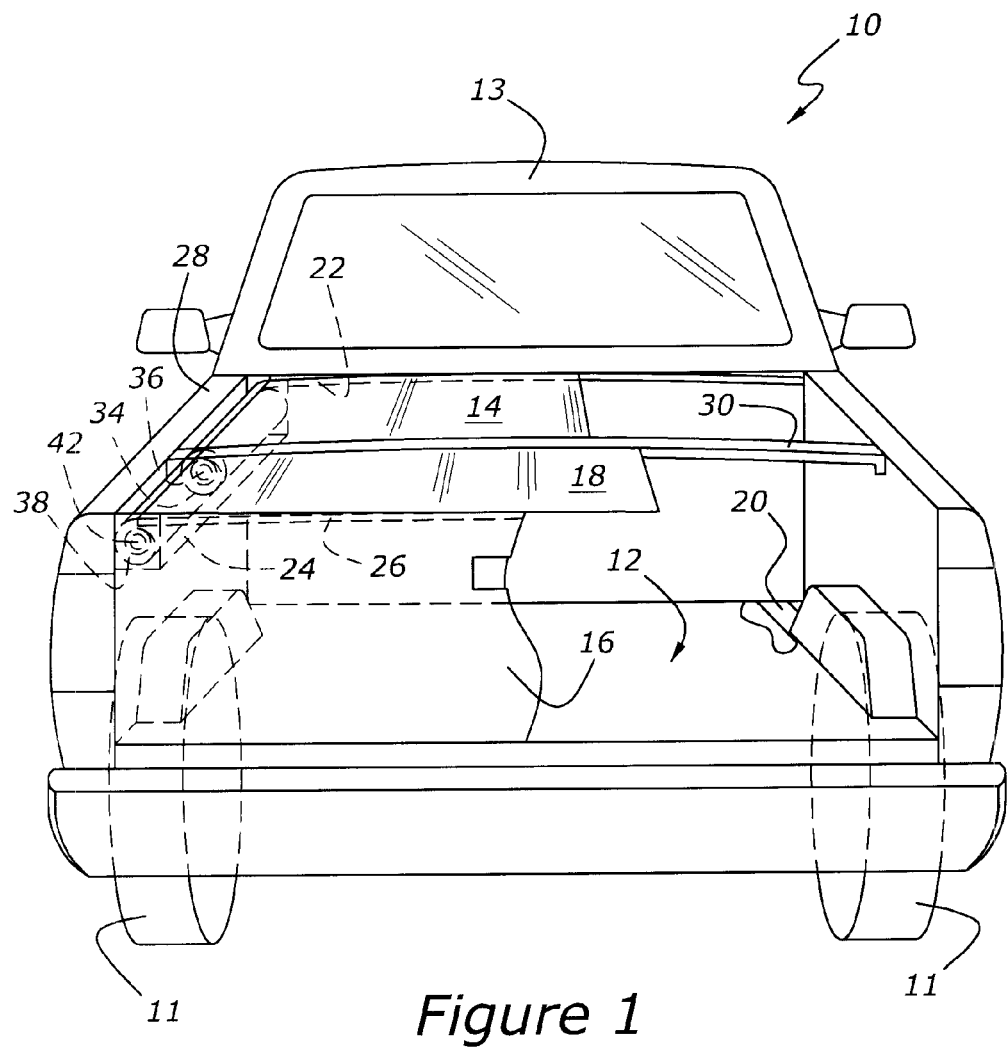
FIG. 1 is a rear perspective view of a pickup truck having a load bed cover according to an aspect of the present invention.
Figure 8:
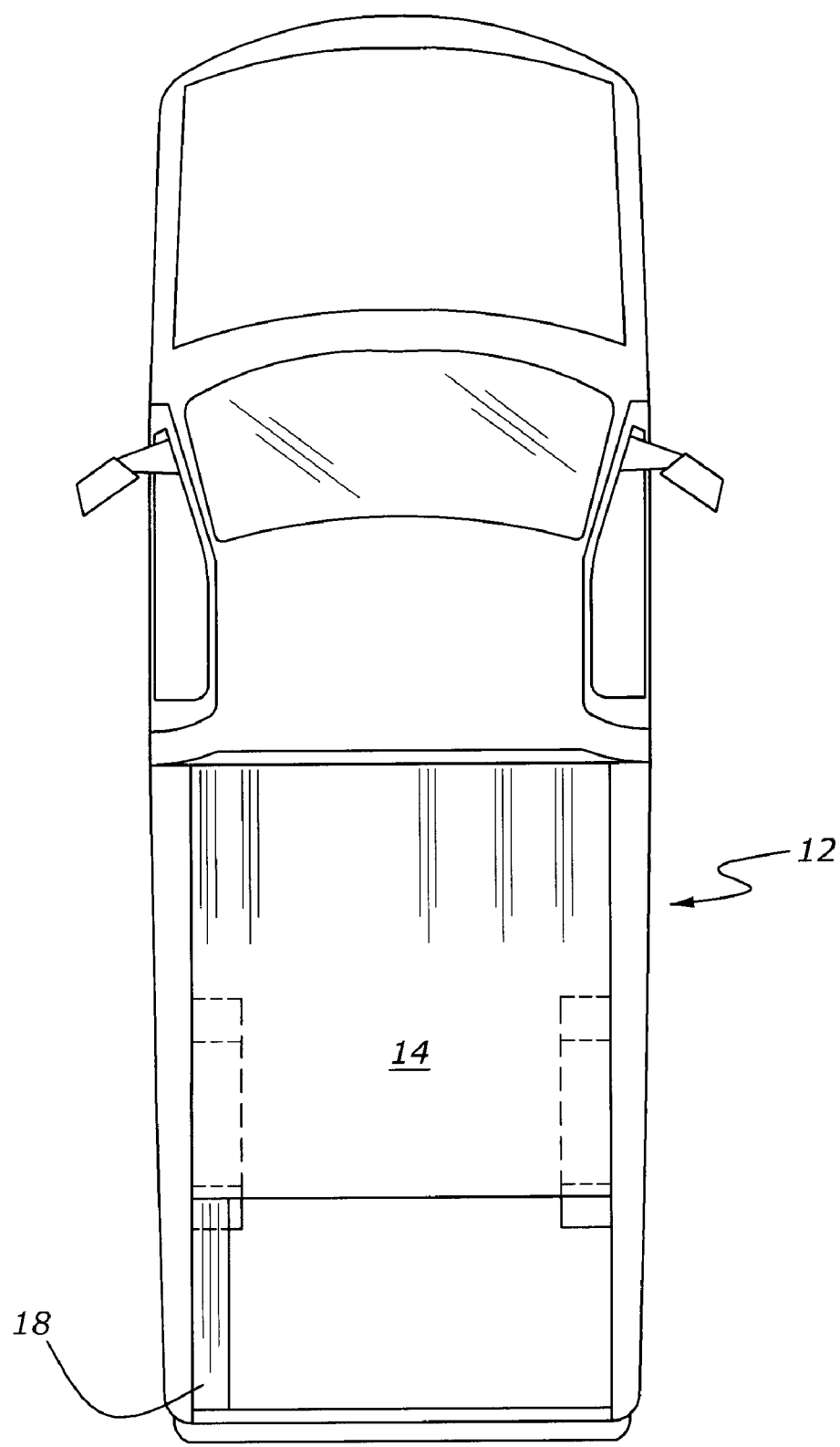
FIG. 8 shows a frontal portion of the cover completely closed and a rearward portion completely open.
Figure 9:
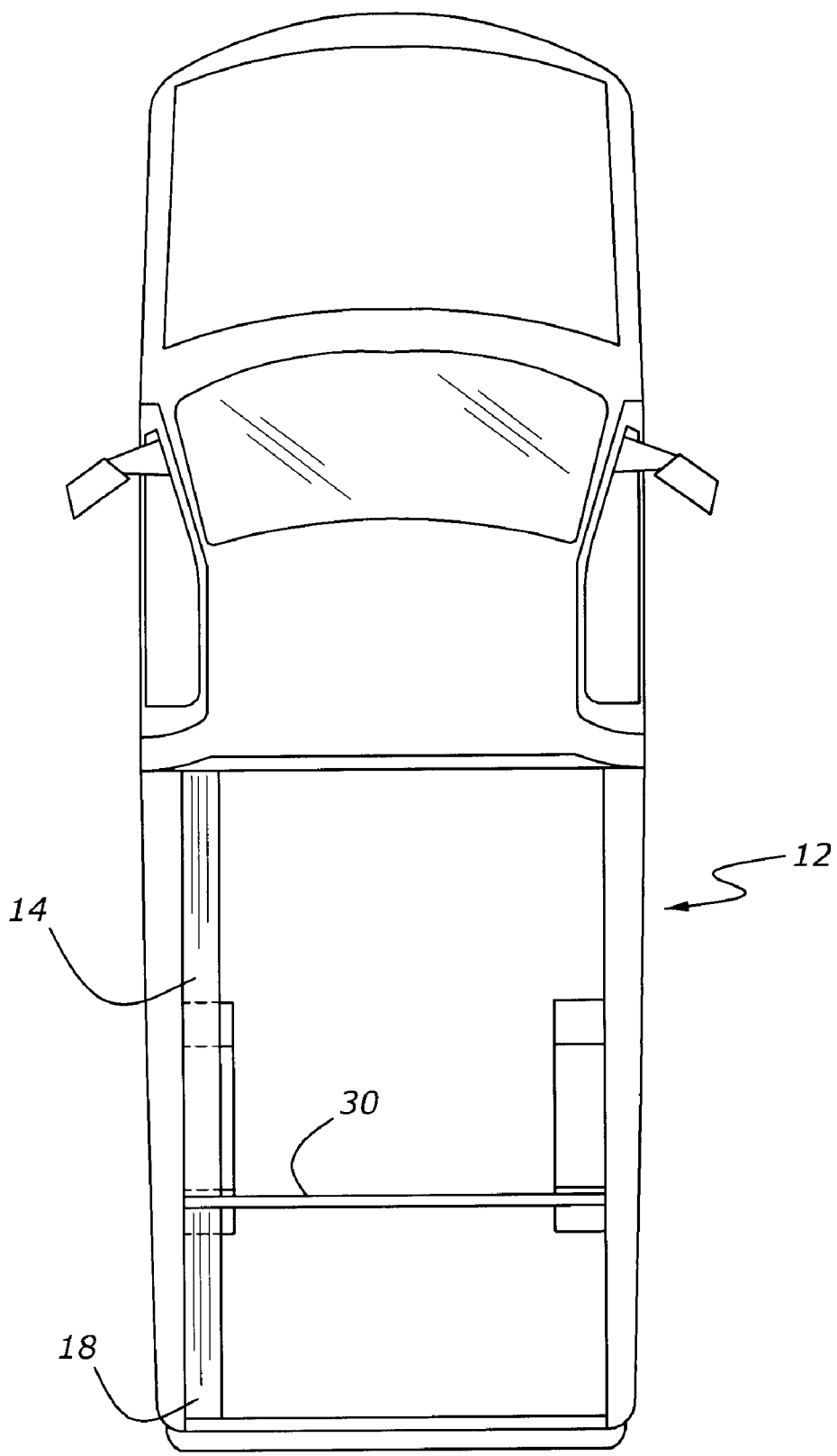
FIG. 9 shows both the front and rearward portions of the cover in open positions.
Figure 10:
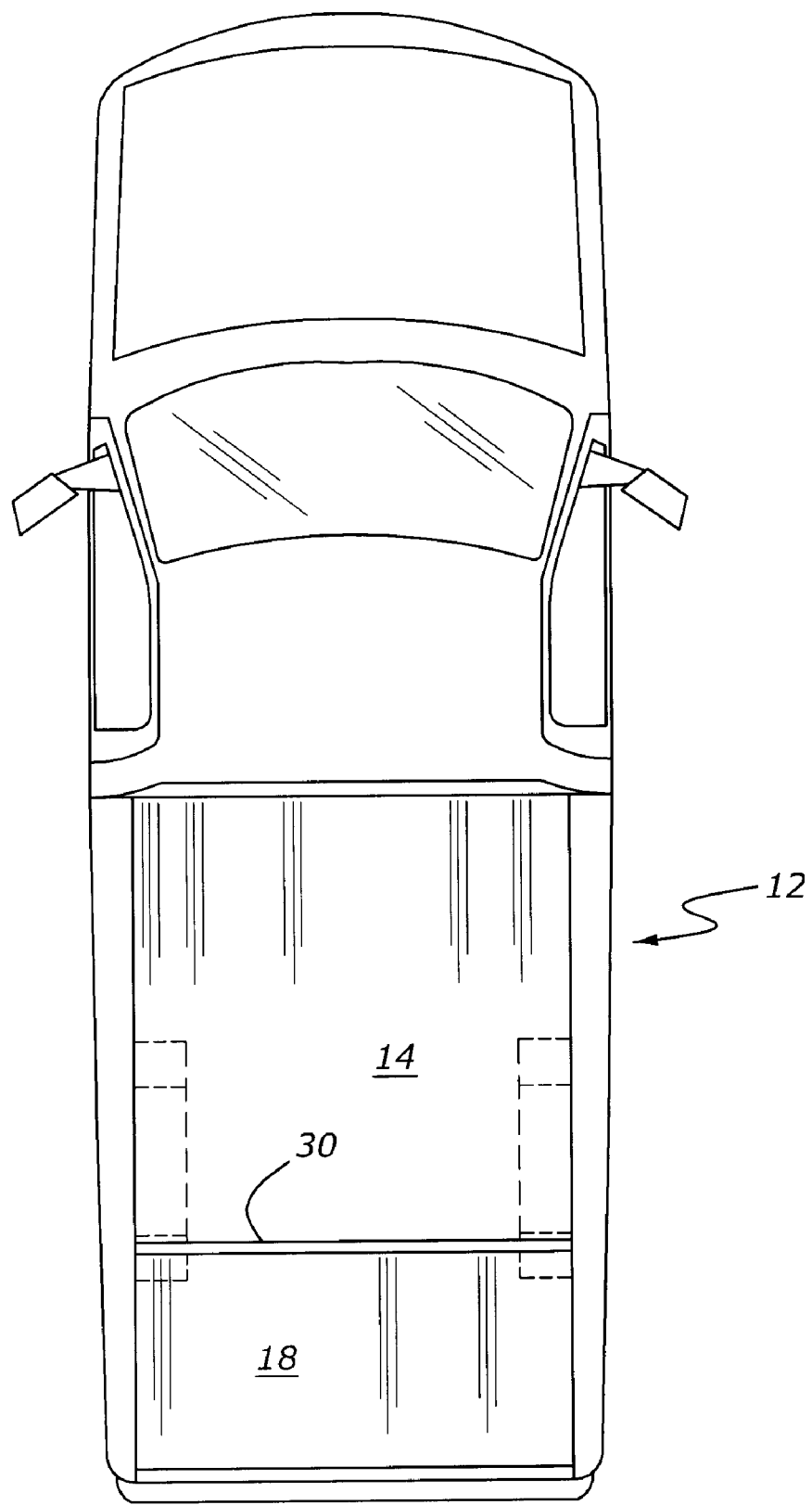
FIG. 10 is a plan view in which both a first, or front, cover sector, and a second, or rear, cover sector, are closed over a load bed.

As shown in FIG. 1, an automotive vehicle, in this case a pickup truck, 10, has a cab, 13, a chassis, 20, and a number of road wheels, 11. A load bed, 12, is attached to chassis 20. A first cover sector, 14, is deployable laterally from a housing, 24, which is associated with a first bodyside, 28 of load bed 12. According to an aspect of the present invention, first cover sector 14 preferably and selectively encloses about two-thirds of the area of load bed 12. Conversely, a second cover sector, 18, preferably and selectively encloses about one-third of load bed 12. First cover sector 14 and second cover sector 18 cooperate to selectively enclose the entirety of load bed 12. As shown in FIGS. 6-10, first cover sector 14 and second cover sector 18 may be selectively deployed to enclose only the rearward one-third of load bed 12 (FIG. 6); or only a portion of the forward two-thirds of load bed 12 (FIG. 7); or, only the leading two-thirds of load bed 12, while leaving the trailing one-third of the load bed uncovered (FIG. 8). Additionally, both of cover sectors 14 and 18 may be opened so that none of load bed 12 is enclosed (FIG. 9); or, both of first cover sector 14 and second cover sector 18 maybe closed so that the entirety of load bed 12 is enclosed (FIG. 10).

The fuel saving capability of the present invention is important, given the rising cost of motor fuel. The present inventors have determined that a complete covering of the load bed, such as that shown in FIG. 10, produces a substantial fuel savings. However, about 80 percent of the fuel savings achievable with the cover configuration as shown in FIG. 10, is produced by the configuration in FIG. 6, in which only about the trailing one-third of load bed 12 is enclosed. As a result, it is possible to operate the present load bed cover either as shown as FIG. 6, or as FIG. 7, and to achieve a substantial, measurable fuel savings even though the cover is partially open. Those skilled in the art will appreciate in view of this disclosure that the precise proportions of first cover sector 14 and second cover sector 18 may be selected to meet the needs of any particular group of vehicle users. What is important is that the rearmost part of load bed 12 be enclosed whenever possible, because this closure mode produces a demonstrable fuel economy benefit.

First cover sector 14 and second cover sector 18 are both flexible, and are preferably comprised of fabric materials, stiffened by slats, so as to allow the cover sectors to be both pushed and pulled during the closing and opening operations. Such construction is known to those in the art. Each of the covers are attached to a winder. Thus, front cover sector 14 is attached to winder 34. Winder 34 may be operated either manually, of with a front motor, 36. Second cover sector 18 is attached to a winder, 38, which may be powered by rear motor 42, or manually. Motors 36 and 42, if used, both push and pull their respective cover sectors, so as to open and close the covers.

Figure 2:
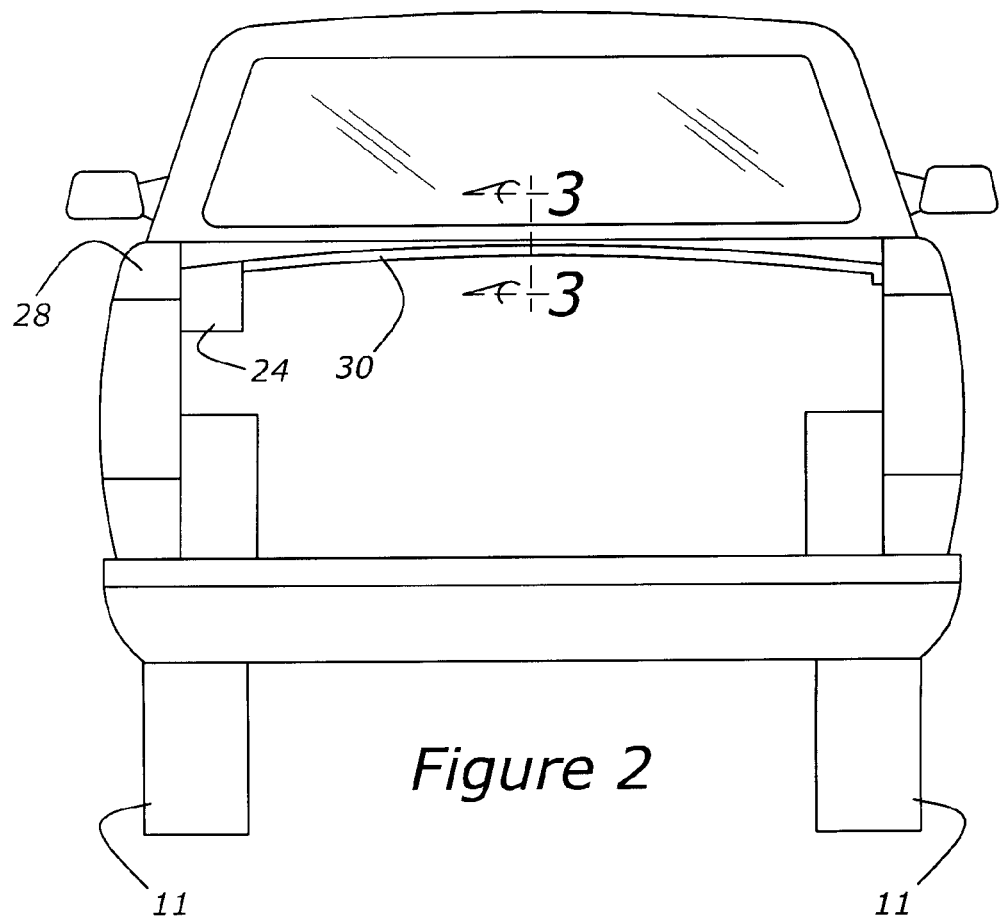
FIG. 2 illustrates a mid-bed guide or rail according to an aspect of the present invention.
Figure 3:
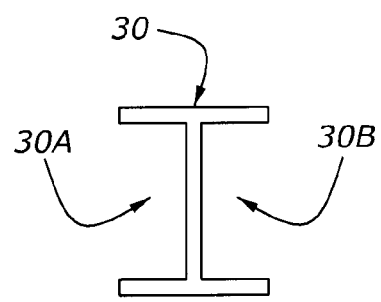
FIG. 3 is a sectional view of the mid-bed rail of FIG. 2, taken along the line 3-3 of FIG. 2.
Figure 4:
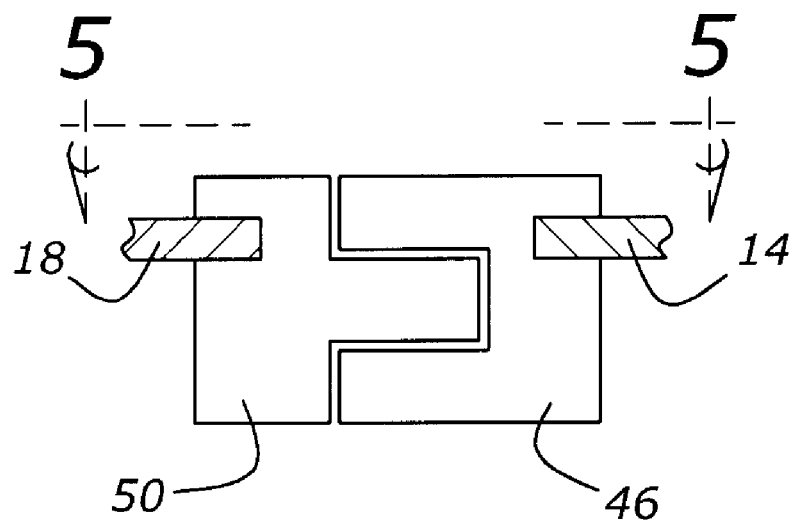
FIG. 4 is a sectional view, partially in elevation, of alpha and beta self-supporting rail segments incorporated into first and second cover sectors according an aspect of the present invention.
Figure 5:
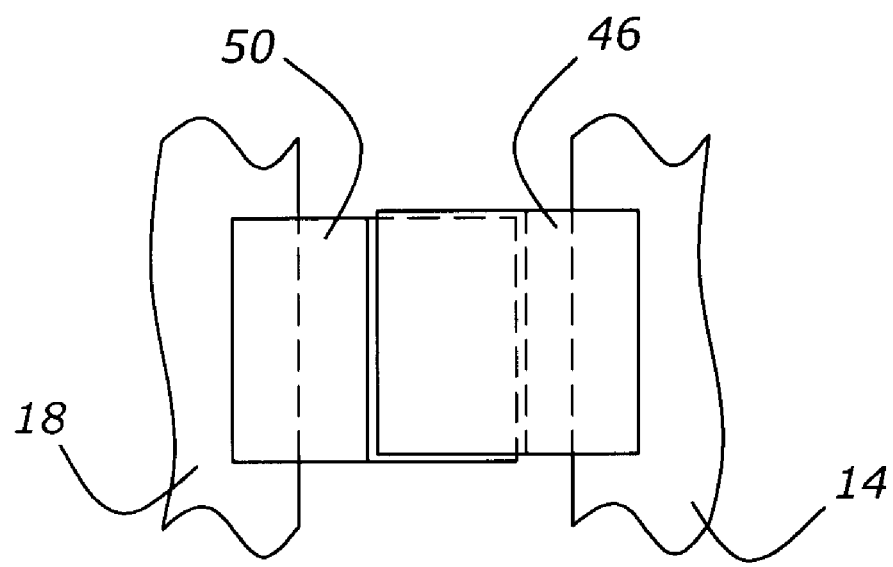
FIG. 5 is an elevational view of the alpha and beta self-supporting rail segments of FIG. 4, taken along the line 5-5 of FIG. 4.
Figure 6:
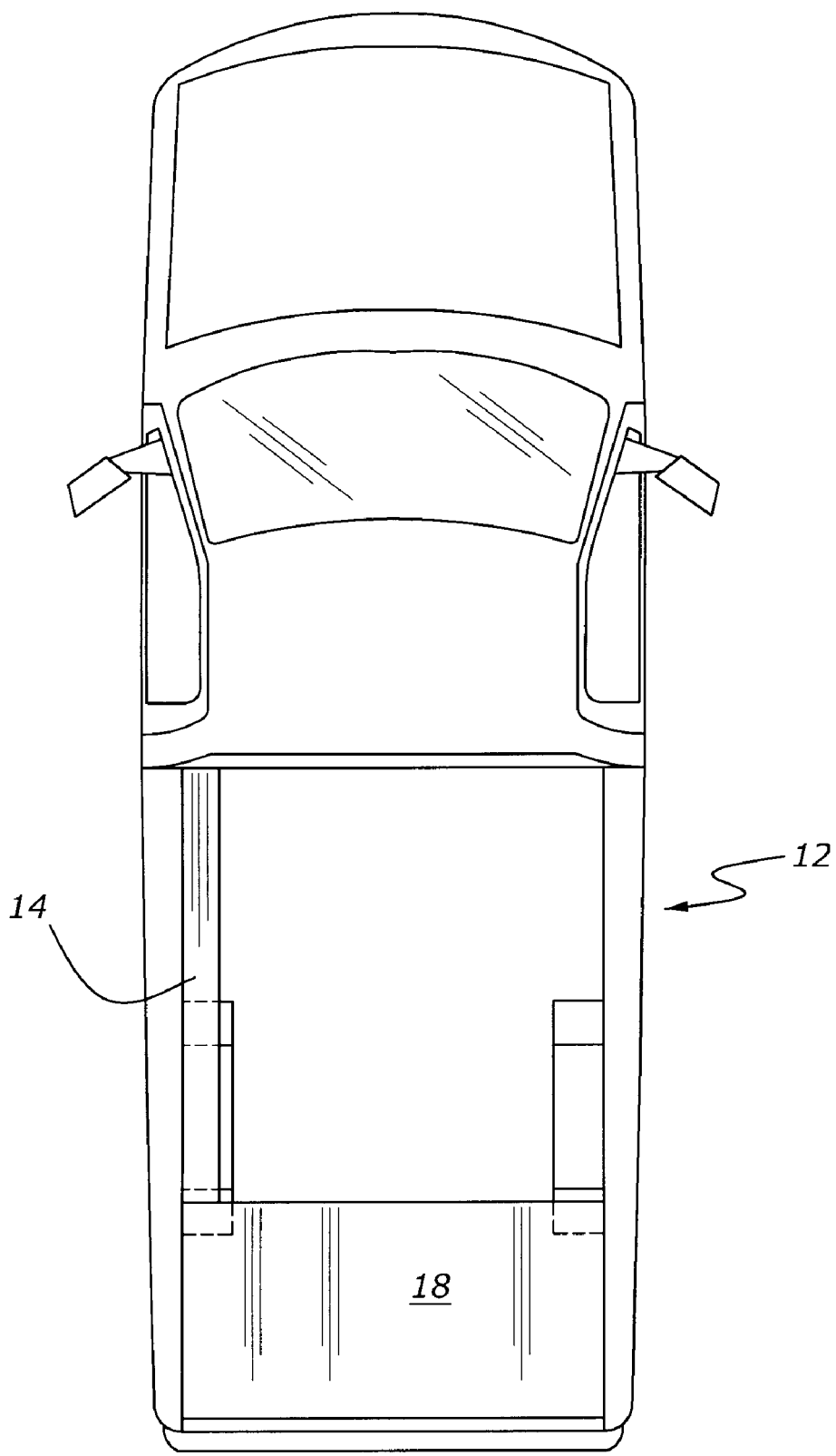
FIG. 6 is a plan view of the pickup truck bed of FIG. 1, showing the rearward portion of a cover closed and a front portion open. This reduces aerodynamic drag, as compared with having the load bed completely uncovered.
Figure 7:
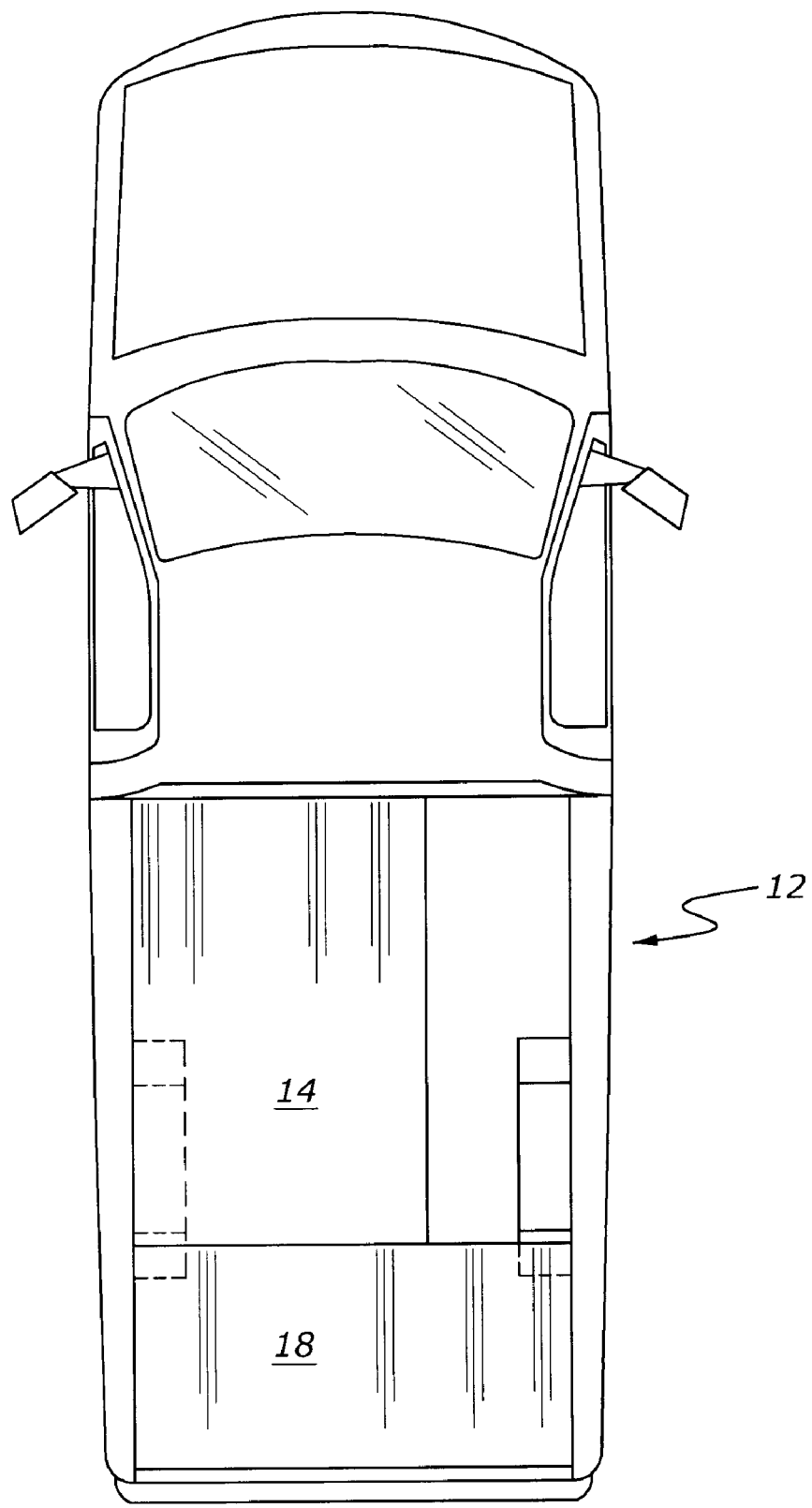
FIG. 7 shows a frontward portion of the present inventive cover partially opened, and a rearward portion completely closed.

Operation of cover sectors 14 and 18 is assisted by a forward guide 22, (FIG. 1), which is mounted to the head rail of load bed 12, and a trailing guide, 26 which is attached to tailgate 16 of vehicle 10. Forward guide 22 and trailing guide 26 are essentially channels along which the cover sectors slide. A mid-bed guide or rail, 30, may be positioned between the two cover sectors. This rail, 30, which is shown in greater detail in FIGS. 2 and 3, has a I-beam type of construction with two slots, 30A and 30B, to allow sliding of cover sectors 14 and 18 as they are opened and closed.

in the event that mid-bed rail 30 is not used, front cover sector 14 may be equipped with an alpha rail segment, 46, shown in FIG. 4. And, second cover sector 18 will correspondingly equipped with a complimentary beta rail segment 50. These rail segments interlock as shown in FIGS. 4 and 5, to support first cover sector 14 and second cover sector 18 as the cover sectors are moved across the width of load bed 12. More precisely, as alpha and beta rail segments mesh with one another, they provide an interlocking support for the two cover sectors.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A multi-mode load bed cover for an automotive vehicle, comprising:
   a first cover sector which is deployable laterally from within a housing associated with a bodyside of a load bed; and
   a second cover sector, also deployable laterally from within said housing, with said second cover sector cooperating with said first cover sector to selectively enclose the entirety of the load bed, wherein said first cover sector and said second cover sector are positionable in at least a first mode in which the entirety of the load bed is enclosed, a second mode in which only a forward portion of the load bed is enclosed by the first cover sector, a third mode in which only a rearward portion of the load bed is enclosed by the second cover sector, and a fourth mode in which no part of the load bed is enclosed by either the first cover sector or the second cover sector.

2. A multi-mode load bed cover according to claim 1, wherein said first cover sector and said second cover sector are both flexible.

3. A multi-mode load bed cover according to claim 1, further comprising a forward guide, located proximate a front end of the load bed, and a trailing guide, located proximate a trailing end of the load bed, with said first cover sector engaging the forward guide when the first cover sector is deployed, and said second cover sector engaging the trailing guide when the second cover sector is deployed.

4. A multi-mode load bed cover according to claim 3, further comprising a mid-bed guide, positioned between said first cover sector, and said second cover sector, and extending laterally across the top of the load bed, with said mid-bed guide providing support for said first cover sector and said second cover sector.

5. A multi-mode load bed cover according to claim 4, wherein the mid-bed guide comprises an independent rail attached to left and right bodyside portions of the load bed, with said rail having recesses for slidingly receiving the first cover sector and the second cover sector.

6. A multi-mode load bed cover according to claim 1, wherein said first cover sector and said second cover sector are stowable upon separate winders located within said housing.

7. A multi-mode load bed cover according to claim 6, wherein said winders are motor driven.

8. A multi-mode load bed cover according to claim 7, wherein said winders are configured both to open and to close said first cover sector and said second cover sector.

9. A multi-mode load bed cover according to claim 1, wherein said first cover sector and said second cover sector are positionable in at least one additional mode in which the first cover sector is closed over the load bed and the second cover sector is only partially closed over the load bed.

10. A multi-mode load bed cover according to claim 1, wherein said first cover sector and said second cover sector are positionable in at least one additional mode in which the first cover sector is only partially closed over the load bed and the second cover sector is only partially closed over the load bed.

11. A multi-mode load bed cover for an automotive vehicle, comprising:

a first cover sector which is deployable laterally from within a housing contained within a bodyside of a load bed, with said first cover sector being deployable to selectively enclose a forward portion of the load bed; and a second cover sector, also deployable laterally from within said housing, with said second cover sector being selectively deployable to enclose a rearward portion of the load bed, and with the first cover sector and the second cover sector cooperating to selectively enclose the entirety of the load bed, wherein said first cover sector and said second cover sector are deployable in a maximum fuel saving mode in which the first cover sector and the second cover sector are both closed over the load bed and a partial fuel saving mode in which the first cover sector is open and the second cover sector is at least partially closed.

12. A multi-mode load bed cover according to claim 11, wherein the first cover sector is sized to enclose about two-thirds of the load bed, and the second cover sector is sized to enclose about one-third of the load bed.

* * * * *